United States Patent
Brown et al.

(10) Patent No.: US 9,381,479 B1
(45) Date of Patent: Jul. 5, 2016

(54) TOOL COUPLING AND METHOD FOR MULTI-COMPONENT COMPOSITION MIXING

(71) Applicant: The Boeing Company, Chicago, IL (US)

(72) Inventors: Bradley C. Brown, Spanaway, WA (US); Steven J. Russell, Tacoma, WA (US); Wayne C. Howard, Graham, WA (US)

(73) Assignee: The Boeing Company, Chicago, IL (US)

( * ) Notice: Subject to any disclaimer, the term of this patent is extended or adjusted under 35 U.S.C. 154(b) by 482 days.

(21) Appl. No.: 13/896,366

(22) Filed: May 17, 2013

(51) Int. Cl.
*B01F 7/00* (2006.01)

(52) U.S. Cl.
CPC ...................... *B01F 7/001* (2013.01)

(58) Field of Classification Search
CPC ................ B01F 2015/00649; B01F 7/001
USPC ................... 366/331; 279/112, 83
See application file for complete search history.

(56) References Cited

U.S. PATENT DOCUMENTS

| | | | | |
|---|---|---|---|---|
| 120,015 A | * | 10/1871 | Albro | B23B 1/101 279/112 |
| 224,345 A | * | 2/1880 | McAnly | B23B 31/101 269/218 |
| 1,844,691 A | * | 2/1932 | Schneider | A47J 43/24 366/252 |
| 2,449,818 A | * | 9/1948 | Olsen | A45D 44/00 134/143 |
| 2,551,636 A | * | 5/1951 | Ratigan | B23B 31/101 24/135 N |
| 2,739,500 A | * | 3/1956 | Kordish | B25F 1/003 279/112 |
| 3,460,268 A | * | 8/1969 | Greathouse | A46B 17/06 15/38 |
| 5,439,236 A | * | 8/1995 | Musil | B01F 7/001 279/102 |
| 6,712,368 B2 | | 3/2004 | Bohn et al. | |
| 7,066,940 B2 | | 6/2006 | Riedel et al. | |
| 8,308,168 B2 | | 11/2012 | Nash | |

* cited by examiner

*Primary Examiner* — David Sorkin
(74) *Attorney, Agent, or Firm* — Walters & Wasylyna LLC

(57) ABSTRACT

A disclosed tool coupling may include a clamp configured to hold a stirring tool and a shank connected to the clamp, the shank and the clamp sharing an axis of rotation, the clamp including a clamp housing defining an open interior region configured to receive the stirring tool and at least one adjustable fastener operably connected to the clamp housing, the fastener being configured to retain the stirring tool within the interior region.

15 Claims, 8 Drawing Sheets

TOOL COUPLING AND METHOD FOR MULTI-COMPONENT COMPOSITION MIXING

FIELD

The present disclosure is generally related to a tool coupling and, more particularly, to a tool coupling for connecting a stirring tool to a driver.

BACKGROUND

In order to use many types of sealants, adhesives and bonding agents, at least two different active components/ingredients must be combined together, such as by stirring or mixing, to form a single composition. For example, epoxy compositions are commonly prepared by thoroughly mixing a first (epoxy resin) component with a second (hardener) component prior to application. While initial combination of the different active components is relatively simple, ensuring that they are fully mixed may be both time consuming and strenuous.

Typically, the active components are mixed in small containers and only small amounts of the final composition are prepared at any given time and. Once combined, the active components can form a thick composition, which requires a preparer to strenuously grip a mixing or stirring tool and repeatedly move the tool through the thick composition in order to fully and properly mix the components. This motion can lead to fatigue in the hands, wrists and arms of the preparer.

Unfortunately, fatigue can cause the preparer to prematurely cease stirring of the composition. Proper mix ratio and thorough mixing of the active ingredients are essential to achieving the desired physical properties of the composition (e.g., consistency, viscosity and bonding properties). If the two (or more) components are not mixed thoroughly, the composition may cure soft and may not develop all the required or desired physical properties.

Accordingly, there is a need to develop a more desirable method of multi-component composition mixing. It would be desirable to have a method and apparatus that takes into account at least some of the issues discussed above, as well as other possible issues. Therefore, those skilled in the art continue with research and development efforts in the field of multi-component composition mixing.

SUMMARY

In one variation, the disclosed tool coupling may include a clamp configured to hold a stirring tool and a shank connected to the clamp, wherein the shank and the clamp share an axis of rotation. The stirring tool may be a disposable stirring tool, such as a tongue depressor or a paint stirrer.

In another variation, the disclosed tool coupling may include a clamp configured to hold a stirring tool and a shank connected to the clamp, wherein the shank and the clamp share an axis of rotation, the clamp including a clamp housing defining an open interior region configured to receive the stirring tool and at least one adjustable fastener operably connected to the clamp housing, the fastener being configured to retain the stirring tool within the interior region.

In another variation, the disclosed tool coupling may include a clamp configured to hold a stirring tool and a shank connected to the clamp, wherein the shank and the clamp share an axis of rotation, the clamp including a clamp housing, a clamp plate connected to the clamp housing, the clamp housing and the clamp plate, in combination, defining an open interior region configured to receive the stirring tool, and at least one adjustable fastener operably connected to the clamp plate and extending into the interior region, the fastener being configured to retain the stirring tool within the interior region.

In another variation, disclosed is a method for mixing a composition, the method may include the steps of (1) coupling a stirring tool to a driver by way of a tool coupling; (2) actuating said driver to rotate said tool coupling and said stirring tool; and (3) stirring said composition with said rotating stirring tool.

In another variation, disclosed is a method for mixing a composition, the method may include the steps of: (1) providing at least two components in a container, (2) providing a stirring tool, (3) providing a tool coupling including a clamp and a shank connected to the clamp, wherein the shank and the clamp share an axis of rotation, (4) retaining the stirring tool within the clamp, (5) connecting the shank to a coupling mechanism of a driver, (6) rotating the tool coupling and the stirring tool about the axis of rotation, and (7) stirring the at least two components with the stirring tool.

In yet another variation, disclosed is a method for mixing a composition, the method may include the steps of: (1) providing at least two components in a container, (2) providing a disposable stirring tool, (3) providing a tool coupling including a clamp and a shank connected to the clamp, wherein the shank and the clamp share an axis of rotation, (4) retaining the stirring tool within the clamp, (5) connecting the shank to a coupling mechanism of a driver, (6) actuating the driver to rotate the tool coupling and the stirring tool about the axis of rotation, (7) stirring the at least two components with the stirring tool; and (8) discarding the stirring tool after the stirring step is complete.

Other variations of the disclosed tool coupling and associated method will become apparent from the following detailed description, the accompanying drawings and the appended claims.

DETAILED DESCRIPTION

Figure 1:
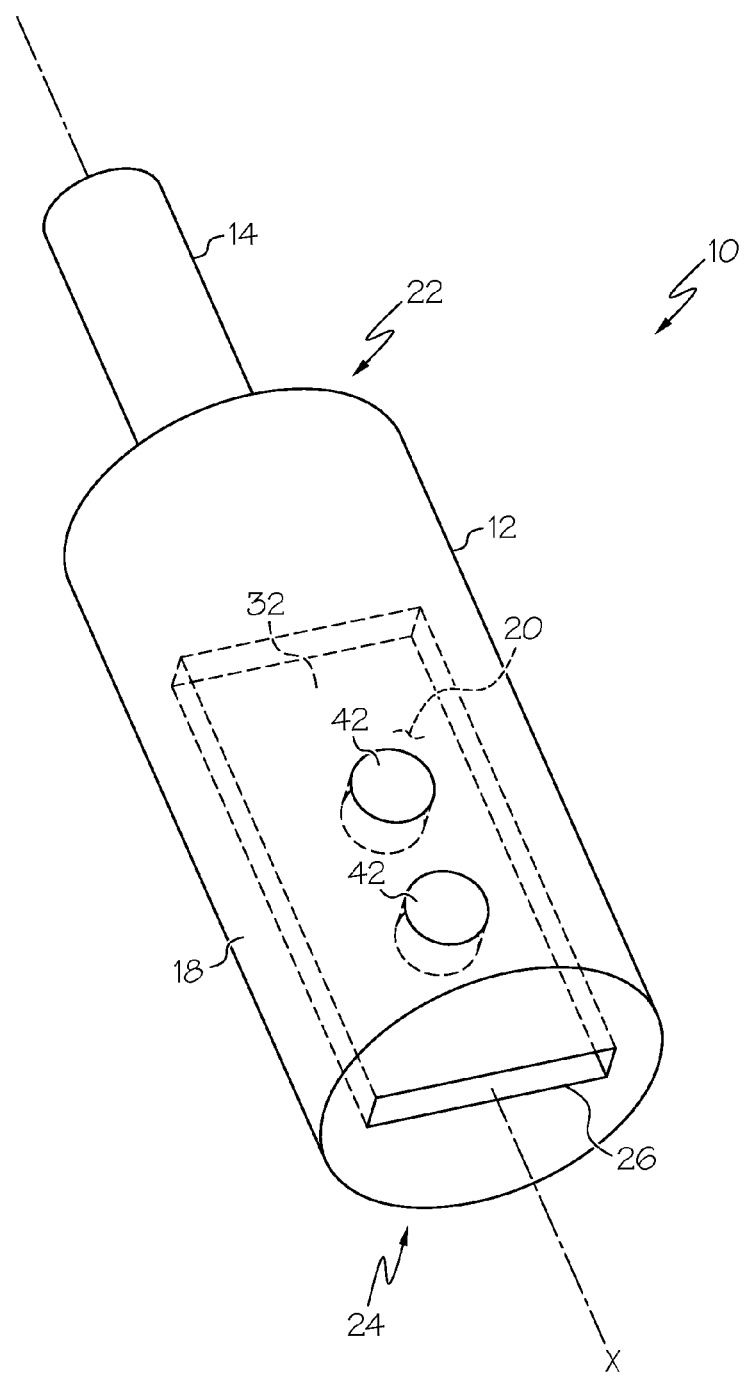
FIG. 1 is a side and end perspective view of one variation of the disclosed tool coupling.

The following detailed description refers to the accompanying drawings, which illustrate specific variations and implementations of the disclosure. Other variations and implementations having different structures and operations do not depart from the scope of the present disclosure. Like reference numerals may refer to the same element or component in the different drawings.

Figure 2:
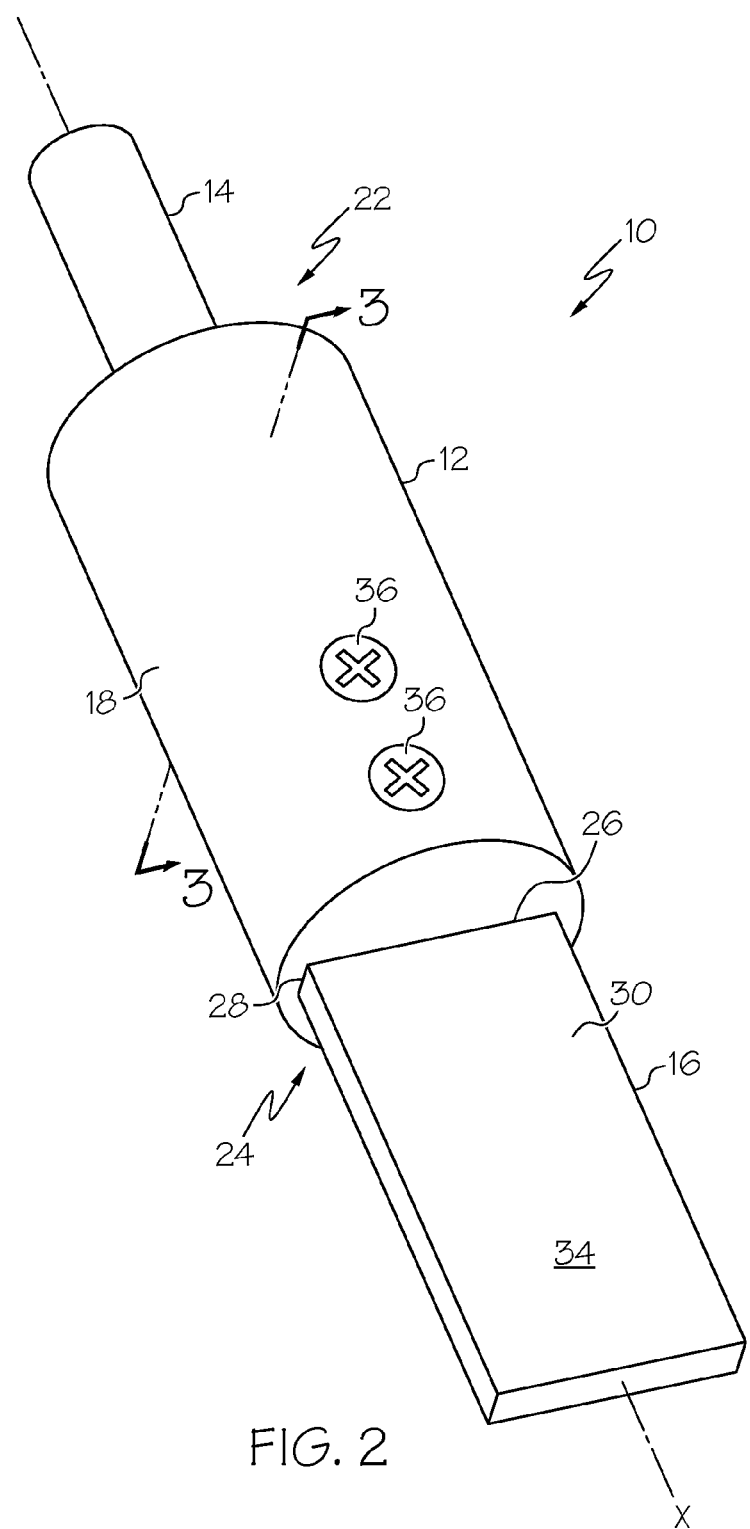
FIG. 2 is a side and end perspective view of the disclosed tool coupling of FIG. 1, depicted with a stirring tool.

Referring to FIGS. 1 and 2, one expression of the disclosed tool coupling, generally designated 10, may include a clamp 12 and a shank 14 connected to the clamp 12. The clamp 12 may be configured to receive and securely retain a stirring tool 16 (FIG. 2). The shank 14 may be configured to operably connect to a driver (not shown), such as a rotary driver, such that the tool coupling 10 and the retained stirring tool 16 may be rotated about a shared axis of rotation X.

Referring to FIG. 1, the clamp 12 may include a clamp housing 18 defining an open interior region 20. As illustrated, the clamp housing 18 may include a substantially cylindrical body elongated about a longitudinal axis X. However, the clamp housing 18 may include various lengths and any cross-sectional shape, without limitation. The clamp housing 18 may include a first end 22 and a longitudinally opposed second end 24.

The shank 14 may be connected to central location (e.g., middle) of the first end 22 of the clamp housing 18 and shares the axis of rotation X with the clamp housing 18. The shank 14 may extend from the first end 22 of the clamp housing 18 a sufficient distance for suitable connection to a variety of rotary drivers. The shank 14 may be any shaft member or similar substantially cylindrical body and may be suitably shaped (e.g., cross-sectional shape) to be operably connected to a holding fixture or coupling member of an electromechanical rotary driver. In an example construction, the shank 14 may include a substantially circular cross-sectional shape suitable to be gripped by a chuck of an electric (or pneumatic) drill. In another example construction, the shank 14 may include a substantially hexagonal cross-sectional shape suitable to be received by a driving end of an electric (or pneumatic) screwdriver. In yet another example construction, the shank 14 may include a substantially square cross-sectional shape suitable to be received by a socket of an electric (or pneumatic) driver. However, the shank 14 may include various lengths and any cross-sectional shape, without limitation.

The second end 24 of the clamp housing 18 may define an opening 26 configured to receive an end 28 (FIG. 3) of the stirring tool 16 for insertion within said interior region 20 and to provide access to the interior region 20. For the purposes of illustration and by example, the stirring tool 16 may be an elongated and relatively thin member (e.g., a member with a thickness dimension that is substantially less than a length and/or a width dimension) made of any durable and rigid or semi-rigid material. The stirring tool 16 may have a substantially rectangular cross-sectional shape, and the substantially rectangular cross-sectional shape may have an aspect ratio (ratio of length to width) of at least 2, such as at least 5 or at least 10. As a specific non-limiting example, the stirring tool 16 may be a stick (e.g., a disposable tongue depressor or paint stirrer) fabricated from wood or plastic.

The opening 26 and the interior region 20 may include a cross-sectional shape (e.g., rectangular, circular or elliptical) substantially the same as the cross-sectional shape (e.g., rectangular, circular or elliptical) of the stirring tool 16 to properly receive the end 28 and at least a portion of the body 30 (e.g., in the length dimension) of the stirring tool 16. Additionally, the dimensions of the opening 26 and the interior region 20 may be in relatively close tolerance with the perimeter dimensions of the stirring tool 16 (e.g., only slightly larger) in order to minimize or restrict movement of the stirring tool 16 once received by the clamp 12. In a non-limiting example construction, the opening 26 and the interior region 20 may include a rectangular shape substantially matching the rectangular cross-sectional shape of the stirring tool 16. However, the opening 26 and the interior region 20 may include various sizes and shapes configured to closely correspond to the size and shape of a corresponding stirring tool 16, without limitation.

Figure 3:
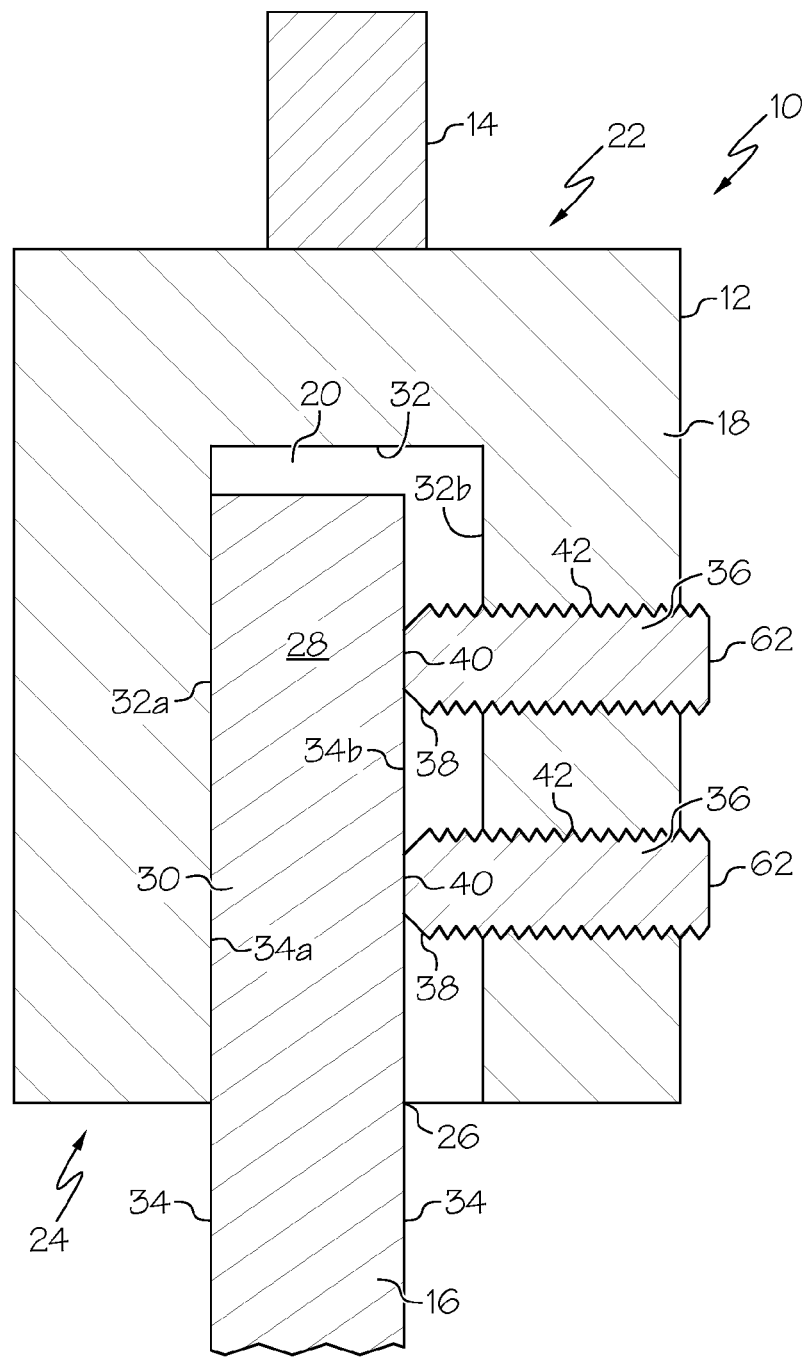
FIG. 3 is a side schematic view in cross-section of the disclosed tool coupling of FIG. 1.

Referring to FIG. 3, the open interior region 20 defined by the clamp housing 18 may include a longitudinal dimension (e.g., length) suitable to receive the end 28 and at least a portion of the elongated body 30 of the stirring tool 16. The location of the stirring tool 16 within the interior region 20 (e.g., the total length of the stirring tool 16 received by the clamp 12) may vary depending upon the physical characteristics desired for the stirring tool 16 during the mixing or stirring process. For example, the end 28 and a small portion of the body 30 (e.g., relatively short distance from the end 28) may be received within at least a portion of the interior region 20 in order to provide a longer usable stirring tool 16, corresponding to more flexibility upon mixing or stirring a composition within a container. As another example, the end 28 and a larger portion of the body 30 (e.g., relatively long distance from the end 28) may be received within the entirety of the interior region 20 in order to provide a shorter usable stirring tool 16, corresponding to more rigidity upon mixing or stirring a composition within a container.

Referring to FIGS. 1 and 3, the interior region 20 may be defined by one or more interior surfaces 32 of the clamp housing 18. At least a portion of the interior surface 32 may be in contact with an outer surface 34 of the stirring tool 16 upon being received by the clamp 12. In the illustrated variation, the rectangular-shaped (in cross-section) interior region 20 may be defined by four interior surfaces 32. Two opposing interior surfaces (e.g., defining the width dimension of the interior region 20), identified individually as 32a and 32b (FIG. 3), may correspond to opposing outer surfaces 34 (e.g., of the width dimension) of the stirring tool 16 and two opposing interior surfaces (e.g., defining the thickness dimension of the interior region 20) may correspond to opposing outer surfaces (e.g., of the thickness dimension) of the stirring tool 16. Of course, the number of interior surfaces 32 may depend on the cross-sectional shape of the interior region 20 (e.g., an interior region 20 having an elliptical cross-sectional shape may have only one continuous surface 32).

Depending upon the dimensions of the interior region 20, at least one interior surface 32 defining the interior region 20 may be in contact with at least one of the outer surfaces 34 of the stirring tool 16 upon being received by the clamp 12. For example, the interior region 20 may be sized and shaped in close tolerance to the size and shape of the stirring tool 16 such that two opposing interior surfaces 32a, 32b are in contact with two opposing outer surfaces 34a, 34b of the stirring tool 16. The interior surfaces 32 defining the interior region 20 may be suitably shaped to contact and/or mate with the outer surfaces 34 of the stirring tool 16. For example, the interior surfaces 32 may be substantially planar to make full contact with at least a portion of the stirring tool 16 having planar outer surfaces 34. As another example, the interior surfaces 32 may be curved (in cross-section) to make full contact with a stirring tool 16 having curved (in cross-section) outer surfaces 34.

Referring still to FIGS. 1-3, the stirring tool 16 may be rigidly secured or held in place within the interior region 20 by at least one adjustable fastener 36. While two fasteners 36 are illustrated by example in FIGS. 2-3, one skilled in the art can appreciate that any number of fasteners 36 may be provided, without limitation. The position of the fasteners 36 may be adjustable with respect to the interior region 20 and thus, the outer surface 34 of the stirring tool 16 upon being received by the clamp 12. A first end 38 of each fastener 36 may be configured to provide a suitable contact point 40 (FIG. 3) for engaging at least a portion of the outer surface 34 of the stirring tool 16 upon movement or positioning of the fastener 36 with respect to the interior region 20. While an adjustable fastener 36 is shown and described, those skilled in the art will appreciate that the end 28 of the stirring tool 16 may be secured relative to the clamp housing 18 using any suitable fastening apparatus or system.

The clamp housing 18 may include at least one through-hole aperture 42 (FIG. 1) configured to receive one fastener 38. While two apertures 42 are illustrated by example in FIGS. 1-3, one skilled in the art can appreciate that the number of apertures 42 may depend on the number of fasteners 36, without limitation. The apertures 42 may extend from an exterior surface of the clamp housing 18 and through the interior surface 32 to provide access to the interior region 20 by the first end 38 of the fastener 36. An opposed second end 62 of the fastener 36 may be exposed within the aperture 42 or may extend beyond the outer surface of the clamp housing 18, depending upon the length of the fastener 36 and the position of the fastener 36 with respect to the interior region 20.

The apertures 42 may be positioned substantially perpendicular to the axis of rotation X and/or to at least one of the interior surfaces 32 configured to contact the outer surface 34 of the stirring tool 16 (e.g., in the width dimension). For example, the fasteners 36 may be positioned opposite at least a portion of the interior surface 32 such that the stirring tool 16 is clamped between the fastener 36 and the interior surface 32. In such a configuration, the contact point 40 (FIG. 3) of the end 38 of the fastener 36 may make contacting engagement with the outer surface 34 (e.g., in the width dimension) of the stirring tool 16 to temporarily hold the stirring tool 16 in position within the clamp 12. Adjustment or positioning of the fasteners 36 may temporarily retain the stirring tool 16 within the clamp 12 and may secure the relative position of the stirring tool 16 within the interior region 20.

As illustrated in the example drawing, the fasteners 36 may be located on one side of the clamp housing 18 and aligned along the axis of rotation X. The fasteners 36 may be configured to contact and engage one or at least a portion of one outer surface 34 of the end 28 of the stirring tool 16. One skilled in the art can appreciate that at least one opposing fastener 38 or more than one opposing fasteners 38 may be located through an opposing (e.g., disposed at approximately 180 degrees) side of the clamp housing 18. In such a configuration, opposing sets of fasteners 38 may contact and engage two opposing outer surfaces 34 (e.g., in the width dimension) of the stirring tool 16. The fasteners 38 may be any suitable mechanical fastening device including, but not limited to, set screws, bolts, pins and detents. For example, the apertures 42 may include internal thread configured to matingly engage the external thread of the set screw. Rotation of the set screw may adjust the position of the set screw (i.e., fastener 36) within the aperture 42 and with respect to the outer surface 34 of the stirring tool 16.

Figure 4:
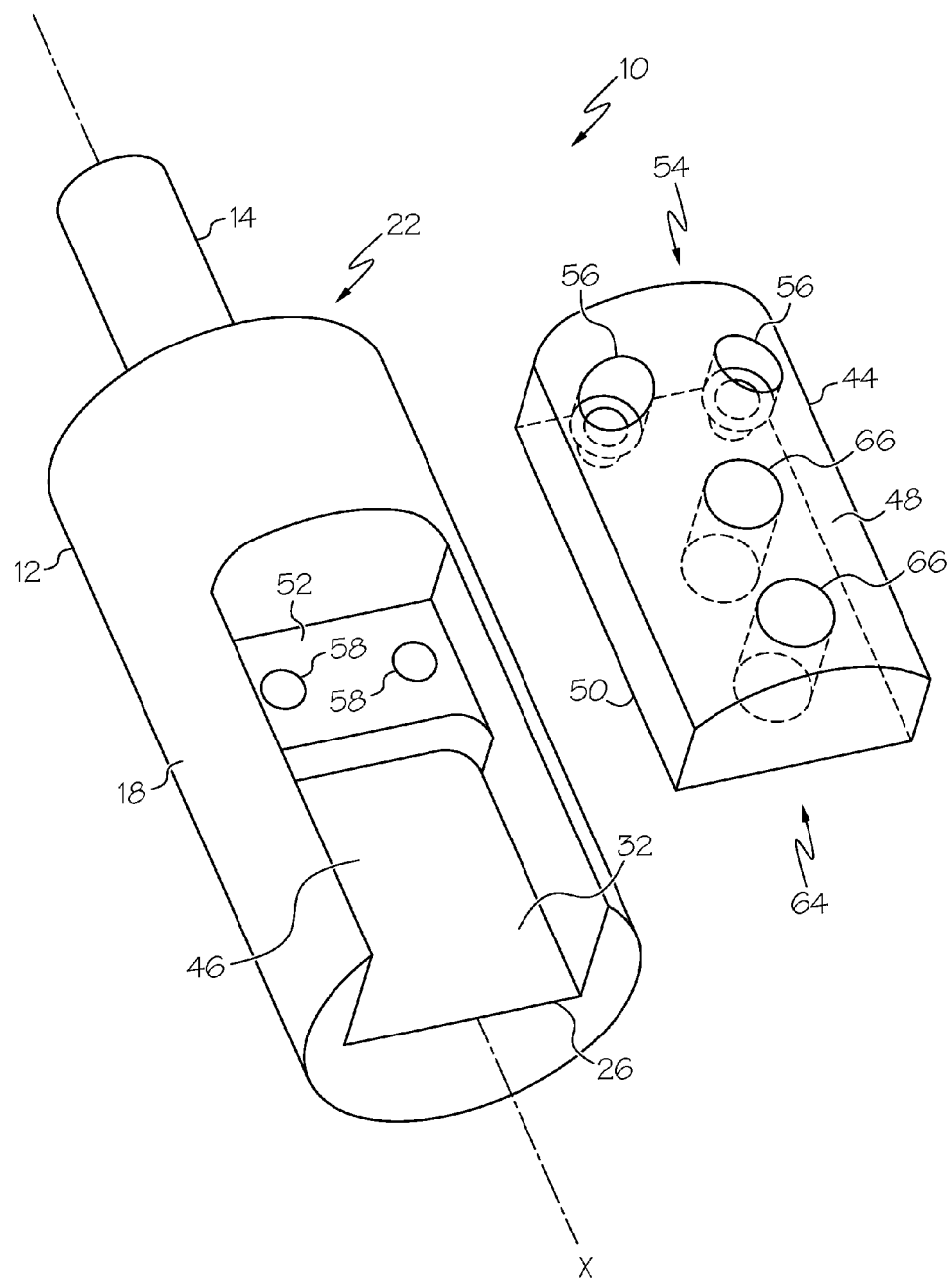
FIG. 4 is an exploded side and end perspective view of another variation of the disclosed tool coupling.
Figure 5:
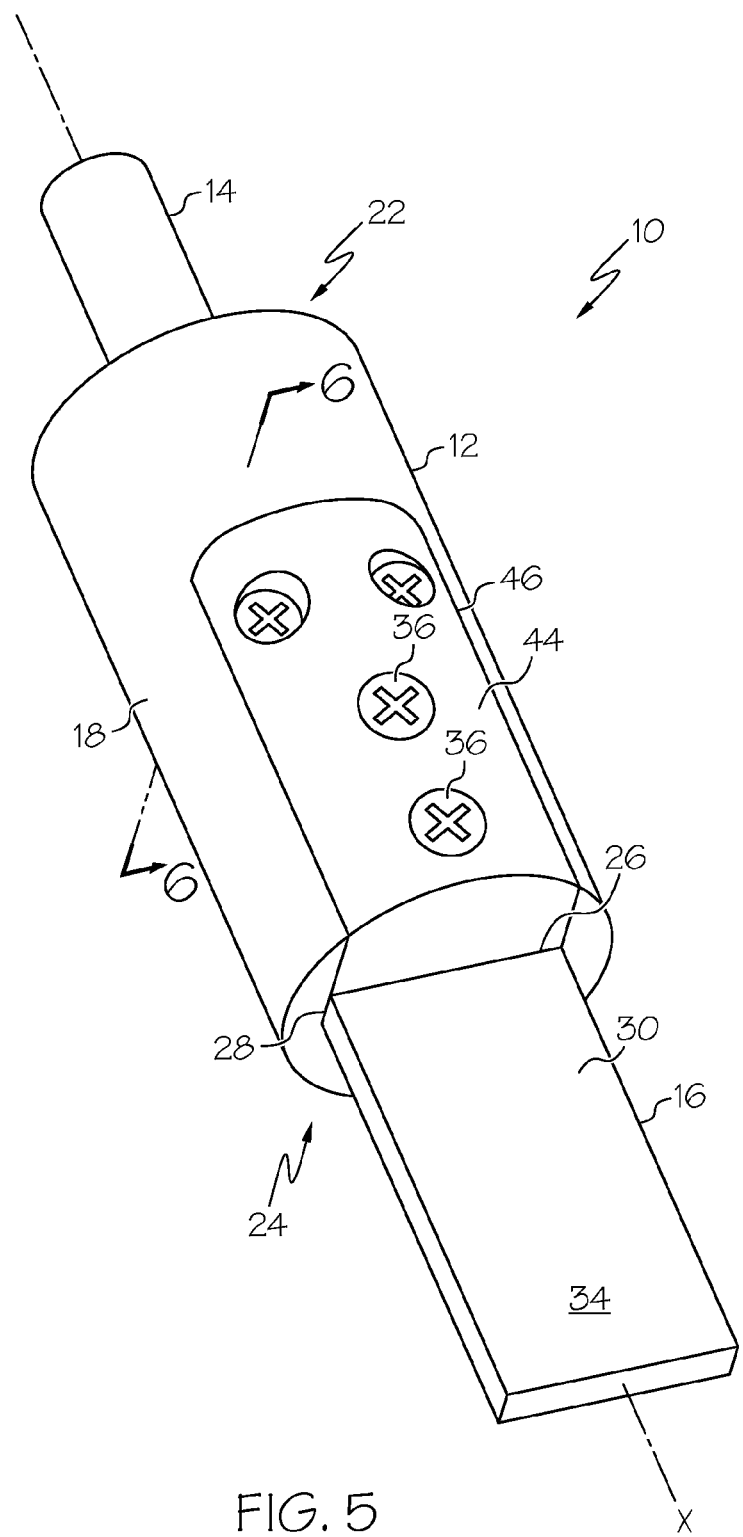
FIG. 5 is a side and end perspective view of the disclosed tool coupling of FIG. 4, depicted with a stirring tool.

Referring to FIGS. 4 and 5, in another variation of the disclosed tool coupling 10, the clamp housing 18 may include a removable clamp plate 44. The clamp plate 44 may be received within a clamp plate recess 46 defined within a portion of the clamp housing 18. The clamp housing 18 and the connected clamp plate 44, in combination, may define the open interior region 20 of the clamp 12.

The clamp plate recess 46 may extend from the second end 24 of the clamp housing 18 toward the first end 22 of the clamp housing 18. The clamp plate recess 46 may include a size and shape configured to snugly receive the clamp plate 44. For example, the dimensions of a perimeter of the clamp plate recess 46 may be in close tolerance (e.g., only slightly larger) to the dimensions of the outer perimeter of the clamp plate 44.

The longitudinal length dimension (e.g., the dimension parallel to the axis of rotation X) of the clamp plate recess 46 may be larger than the longitudinal length dimension of the interior region 20. The width dimension (e.g., the dimension perpendicular to the axis of rotation X) of the clamp plate recess 46 may be substantially equal to the width dimension of the interior region 20. The thickness dimension of the clamp plate recess 46 may be substantially equal to the thickness dimension of the clamp plate 44 and larger than the thickness dimension of the interior region 20.

Figure 6:
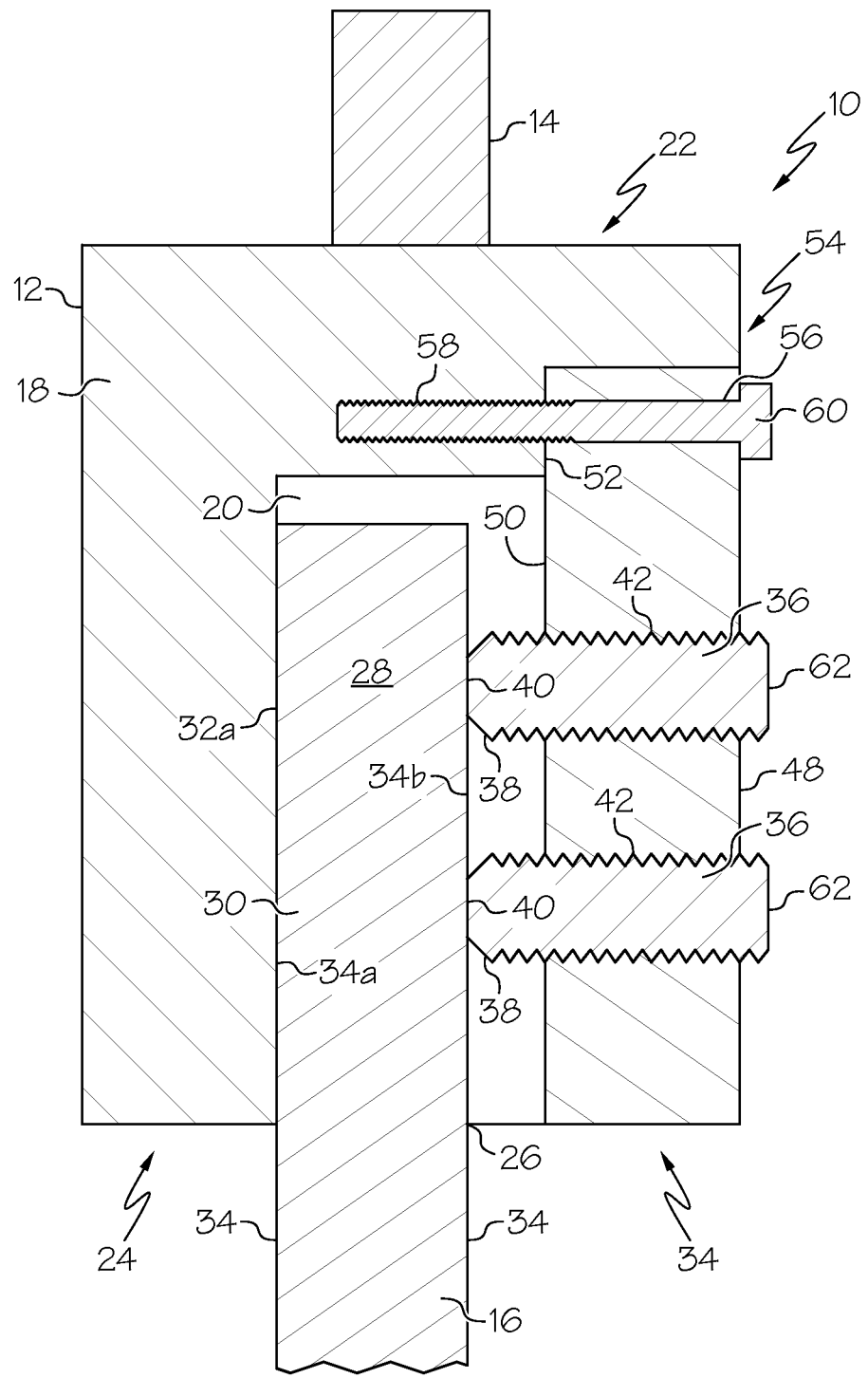
FIG. 6 is a side schematic view in cross-section of the disclosed tool coupling of FIG. 4.

Referring to FIGS. 4 and 6, the clamp housing 18 may include a standoff 52 disposed within the interior region 20 and configured for connection of the clamp plate 44 to the clamp housing 18 within the clamp plate recess 46. The standoff 52 may be attached to or integral to the clamp housing 18. For example, the standoff 52 may extend from the interior surface 32 into the interior region 20. The standoff 52 may be located at a longitudinal end of the interior region 20 opposite the second end 24 of the clamp housing 18. The thickness dimension of the interior region 20 may be defined by the thickness dimension of the standoff 52.

The clamp plate 44 may be connected to the clamp housing 18 within the clamp plate recess 46. In an example construction, a first end 54 of the clamp plate 44 may be fastened to a surface of the standoff 52. For example, the clamp plate 44 may include at least one through-hole fastening aperture 56 and the standoff 52 may include at least one corresponding fastening aperture 58. The fastening apertures 56, 58 may be aligned when the clamp plate 44 is received by the clamp plate recess 46. The aligned apertures 56, 58 may be configured to receive at least one clamp plate fastener 60 to connect the clamp plate 44 to the clamp housing 18.

Referring to FIG. 6, the clamp plate 44 may include an outer surface 48 and an opposing inner surface 50. The outer surface 48 may include a profile configured to match the circumferential profile of the clamp housing 18. For example, the outer surface 48 of the clamp plate 44 may be arcuate having a curve matching the curved circumferential profile of the circular cross-sectional shape of the clamp housing 18. The inner surface 50 of the clamp plate 44 may be substantially planar and configured to contact at least a portion of the outer surface 34 (e.g., in the width dimension) of the stirring tool 16.

The second end 24 of the clamp housing 18 and a second end 64 of the clamp plate 44 may define the opening 26. The opening 26 may be configured to receive the end 28 of the stirring tool 16 and provide access to the interior region 20.

As expressed above, the opening 26 and the interior region 20 may include a cross-sectional shape substantially the same as the cross-sectional shape of the stirring tool 16 to properly receive the end 28 and at least a portion of the body 30 of the stirring tool 16. Additionally, the dimensions of the opening 26 and the interior region 20, as defined by the clamp housing 18 and the clamp plate 44, may be in close tolerance with the perimeter dimensions of the stirring tool 16 (e.g., only slightly larger) in order to minimize or restrict movement of the stirring tool 16 once received by the clamp 12.

The stirring tool 16 may be rigidly secured or held in place within the interior region 20 by at least one adjustable fastener 36. While two fasteners 36 are illustrated by example in FIGS. 5 and 6, one skilled in the art can appreciate that any number of fasteners can be provided, without limitation. The position of the fasteners 36 may be adjustable with respect to the interior region 20 and thus, the outer surface 34 of the stirring tool 16 upon being received by the clamp 12. The first end 38 of each fastener 36 may be configured to provide a suitable contact point 40 (FIG. 6) for engaging at least a portion of the outer surface 34 (e.g., in the width dimension) of the stirring tool 16 upon movement or positioning of the fastener 36 with respect to the interior region 20.

The clamp plate 44 may include at least one through-hole aperture 66 configured to receive the fastener 36. While two apertures 66 are illustrated by example in FIGS. 4-6, one skilled in the art can appreciate that the number of apertures 66 may depend on the number of fasteners 36, without limitation. The apertures 66 may extend from an outer surface 48 of the clamp plate 44 and through the inner surface 50 in order to provide access to the interior region 20 by the first end 38 of the fastener 36. The opposed second end 62 of the fastener 36 may be exposed within the aperture 66 or may extend beyond the surface 48 of the clamp plate 44 depending upon the length of the fastener 36 and the position of the fastener 36.

The apertures 66 may be positioned substantially perpendicular to the axis of rotation X and to the inner surface 50 of the clamp plate 44 and configured to contact the outer surface 34 (e.g., in the width dimension) of the stirring tool 16. In such a configuration, the contact point 40 of the end 38 of the fastener 36 may make contacting engagement with at least a portion of the outer surface 34 of the stirring tool 16 to temporarily hold the stirring tool 16 in position within the clamp 12. Adjustment of the fasteners 36 may temporarily retain the stirring tool 16 within the clamp 12 and may secure the relative position of the stirring tool 16 within the interior region 20.

The fasteners 38 may be any suitable mechanical fastening device including, but not limited to, set screws. For example, the apertures 66 may include internal thread configured to matingly engage the external thread of the set screw. Rotation of the set screw may adjust the position of the set screw (i.e., fastener 36) within the aperture 66 and with respect to the outer surface 34 of the stirring tool 16.

Figure 7:
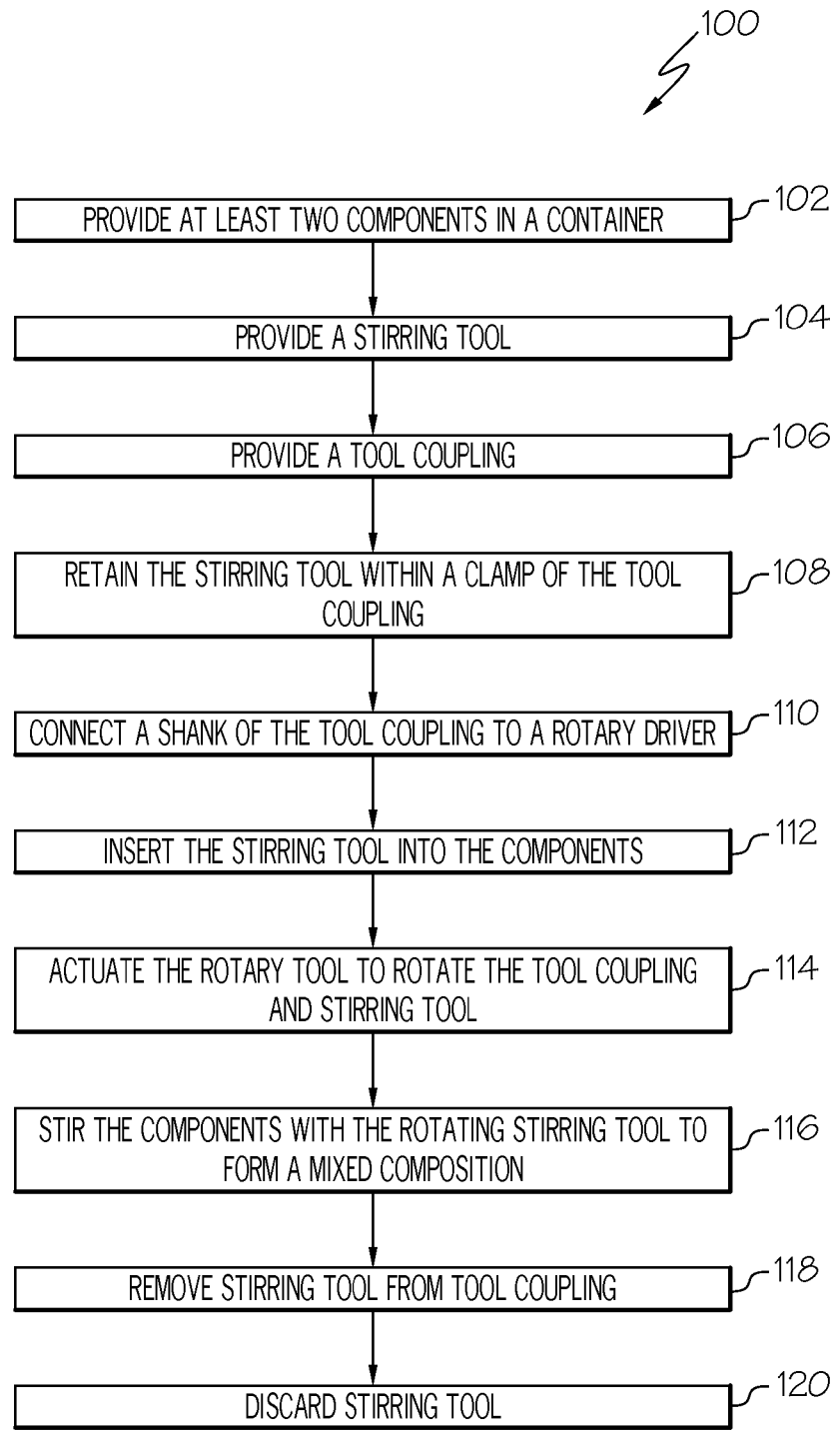
FIG. 7 is a flow diagram of a disclosed method for mixing a composition.

Referring to FIG. 7, also disclosed is a method, generally designated 100, for mixing at least two components in a container to form a composition having a desired consistency and viscosity. The method 100 may include the step of providing at least two components, which when mixed form a composition, as shown at block 102. For example, the components may be a multi-component epoxy, sealant, or bonding agent.

As shown at block 104, the method may include the step of providing a stirring tool 16 (FIGS. 2 and 5). As expressed above, the stirring tool may be any rigid or semi-rigid member suitable for stirring a relatively thick composition and which may be suitably sized to fit within a small container. For example, the stirring tool may be a disposable stirring tool, such as a tongue depressor.

As shown at block 106, the method may include the step of providing a tool coupling 10 (FIGS. 1 and 4) including a clamp 12 configured to hold the stirring tool 16 and a shank 14 connected to the clamp 12 and configured to connect to a rotary driver. The clamp 12 and the shank 14 may share an axis of rotation X (FIGS. 1 and 4), such that rotation of the tool coupling 10 by the rotary driver may rotate the stirring tool 16 retained by the clamp 12.

As shown at block 108, the method may include the step of retaining the stirring tool 16 by the clamp 12 (FIGS. 2 and 5). In accordance with the examples disclosed herein, the stirring tool 16 may be received within the open interior region 20 (FIGS. 3 and 6) defined by the clamp housing 18 (FIG. 3) or the clamp housing 18 and the clamp plate 44, in combination (FIG. 6). Once received within the interior region 20, the stirring tool 16 may be secured to the clamp 12 by operatively engaging the fasteners 36, such that ends 38 of the fasteners 36 are in contact with and press upon the outer surface 34 of the stirring tool 16.

As shown at block 110, the method may include connecting the shank 14 (FIGS. 1 and 4) to a coupling mechanism of a rotary driver. For example, the shank 14 may be connected (e.g., gripped) to the chuck of a drill. As shown at block 112, the method may include the step of inserting at least a portion of the body 30 (e.g., an end) of the stirring tool 16 into the components to be mixed into a composition.

As shown at block 114, the method may include rotating the tool coupling 10 and the retained stirring tool 16 about the axis of rotation X (FIGS. 2 and 5). For example, the stirring tool 16 may be rotated by actuating the rotary driver (e.g., drill), such as by supplying electrical energy or compressed air to the rotary driver.

As shown at block 116, the method may include the steps of stirring the at least two components with the stirring tool 16. For example, the multi-component epoxy may be stirred with an end of the stirring tool 16 (e.g., tongue depressor) until the composition is thoroughly mixed to achieve a desired consistency and/or viscosity.

Once stirring is complete, such as when the multi-component epoxy has been fully mixed, the stirring tool 16 may be removed from the tool coupling 10. As one example, removal of the stirring tool 16 may simply require pulling the stirring tool 16 from the tool coupling 10 along the axis of rotation X. As another example, removal of the stirring tool 16 may require loosening the fasteners 36 prior to pulling the stirring tool 16 from the tool coupling 10 along the axis of rotation X.

As shown in block 120, stirring tool 16 may be discarded. For example, the stirring tool 16 may be a disposable stirring tool, such as a tongue depressor. Therefore, after use, the stirring tool 16 may be discarded, thereby avoiding the time consuming step of cleaning the stirring tool 16.

Accordingly, the disclosed tool coupling 10 and method 100 may facilitate the use of disposable hand stirring tools, such as tongue depressors and paint stirrers, with a power tool, such as an electrically or pneumatically powered rotary driver. Therefore, the disclosed tool coupling 10 and method 100 may facilitate thorough multi-component composition mixing using traditional hand mixing tools (e.g., tongue depressors and paint stirrers), but without the fatigue typically associated with hand mixing.

Figure 8:
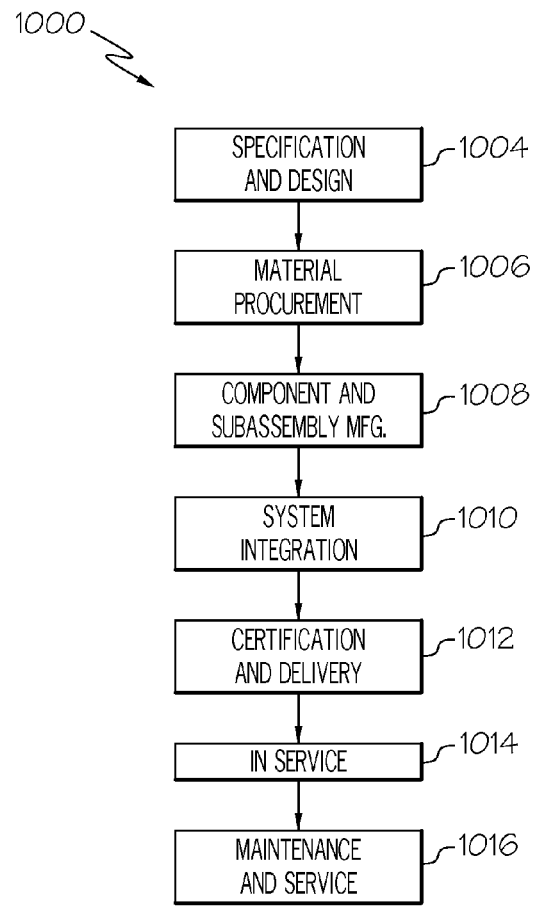
FIG. 8 is a flow diagram of aircraft production and service methodology.
Figure 9:
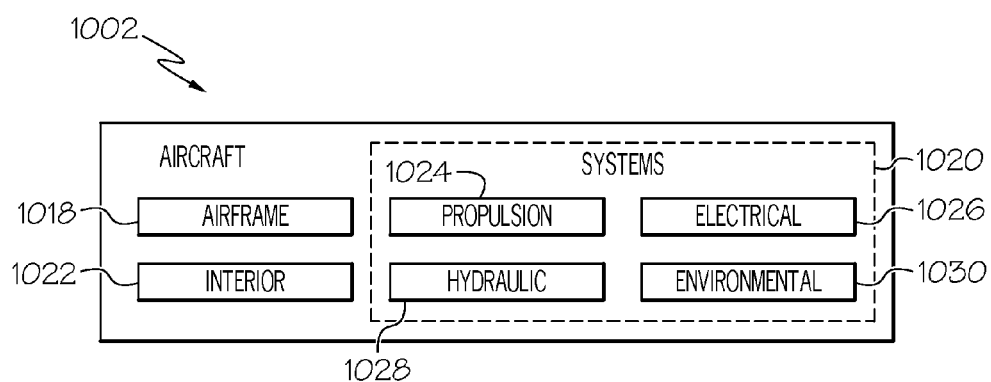
FIG. 9 is a block diagram of an aircraft.

Examples of the disclosure may be described in the context of an aircraft manufacturing and service method 1000, as shown in FIG. 8, and an aircraft 1002, as shown in FIG. 9. During pre-production, example method 1000 may include specification and design 1004 of the aircraft 1002 and material procurement 1006. During production, component and subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 1002 produced by example method 1000 may include an airframe 1018 with a plurality of systems 1020 and an interior 1022. Examples of high-level systems 1020 include one or more of a propulsion system 1024, an electrical system 1026, a hydraulic system 1028, and an environmental system 1030. Any number of other systems may be included. Although an aerospace example is shown, the principles of the invention may be applied to other industries, such as the automotive industry.

Apparatus and methods embodied herein may be employed during any one or more of the stages of the production and service method 1000. For example, components or subassemblies corresponding to production process 1008 may be fabricated or manufactured in a manner similar to components or subassemblies produced while the aircraft 1002 is in service. Also, one or more apparatus examples, method examples, or a combination thereof may be utilized during the production stages 1008 and 1010, for example, by substantially expediting assembly of or reducing the cost of an aircraft 1002. Similarly, one or more of apparatus examples, method examples, or a combination thereof may be utilized while the aircraft 1002 is in service, for example and without limitation, to maintenance and service 1016.

Although various variations and implementations of the disclosed tool coupling and associated method have been shown and described, modifications may occur to those skilled in the art upon reading the specification. The present application includes such modifications and is limited only by the scope of the claims.

What is claimed is:

1. A tool coupling comprising:
   a clamp comprising an axis of rotation and configured to hold a stirring tool, wherein said clamp further comprises:
      a clamp housing;
      a clamp plate connected to said clamp housing, wherein said clamp housing and said clamp plate, in combination, define an open interior region configured to accommodate said stirring tool; and
      at least one adjustable fastener operably connected to said clamp plate and extending into said open interior region, wherein:
         said fastener comprises a fastener first end to selectively engage a surface of said stirring tool,
         a position of said fastener first end is adjustable with respect to said open interior region, and
         said stirring tool is retained within said open interior region by engagement between said fastener first end and said surface of said stirring tool, and
      a shank connected to said clamp and sharing said axis of rotation.

2. The tool coupling of claim 1 wherein said clamp housing comprises an interior surface defining a portion of a perimeter of said open interior region, and wherein said interior surface is configured to contact at least a portion of said surface of said stirring tool.

3. The tool coupling of claim 2 wherein said clamp plate is positioned opposite said interior surface of said clamp housing such that said stirring tool is positioned between said clamp plate and said interior surface.

4. The tool coupling of claim 1 wherein said shank is configured to be connected to a rotary driver.

5. The tool coupling of claim 1 comprising said stirring tool.

6. The tool coupling of claim 5 wherein said stirring tool comprises wood.

7. The tool coupling of claim 1 wherein:
   said clamp housing comprises a first housing end and an opposed second housing end,
   said clamp plate comprises a first plate end and an opposed second plate end,
   said shank is rigidly connected to said first housing end,
   said second housing end and said second plate end define an opening, and
   said stirring tool extends outwardly from said open interior region through said opening.

8. The tool coupling of claim 1 wherein:
   said clamp housing comprises a clamp housing interior surface,
   said clamp plate comprises a clamp plate inner surface,
   said clamp housing interior surface and said clamp plate inner surface define a perimeter of said open interior region,
   said fastener adjustably extends from said clamp plate inner surface, and
   said stirring tool is clamped between said fastener first end and at least a portion of said clamp housing interior surface.

9. The tool coupling of claim 1 wherein said clamp housing comprises a clamp housing interior surface defining at least a portion of a perimeter of said open interior region, and wherein said clamp housing interior surface is configured to contact at least a portion of said surface of said stirring tool.

10. The tool coupling of claim 9 wherein:
    said fastener is positioned opposite at least a portion of said interior surface,
    said fastener first end comprises a contact point, and
    said stirring tool is clamped between said contact point of said fastener first end and said clamp housing interior surface.

11. The tool coupling to claim 1 wherein said clamp plate is removably connected to said clamp housing.

12. The tool coupling of claim 11 wherein said clamp further comprises a clamp plate recess disposed in said clamp housing, and wherein:
    said clamp plate is received within said clamp plate recess, and
    said clamp recess at least partially defines said open interior region.

13. The tool coupling of claim 12 wherein said clamp housing further comprises a fixed standoff disposed within said clamp plate recess, and wherein said clamp plate is removably connected to said standoff.

14. The tool coupling of claim 13 wherein:
    said standoff comprises a standoff thickness,
    said open interior region comprises an interior region thickness dimension, and
    said standoff thickness defines said interior region thickness dimension.

15. The tool coupling of claim 13 wherein said standoff defines an axial limit for positioning said stirring tool within said open interior region with respect to said clamp.

* * * * *